United States Patent [19]

Hardt, deceased et al.

[11] 4,381,361

[45] Apr. 26, 1983

[54] POLYVINYL CHLORIDE MOULDING COMPOSITION

[75] Inventors: Dietrich K. A. Hardt, deceased, late of Leverkusen, Fed. Rep. of Germany, by Helga Hardt, heir; Fritz Mietzsch, Cologne; Otto Billinger, Linz, both of Fed. Rep. of Germany

[73] Assignee: Bayer Aktiengesellschaft, Leverkusen, Fed. Rep. of Germany

[21] Appl. No.: 315,620

[22] Filed: Oct. 28, 1981

[30] Foreign Application Priority Data

Nov. 3, 1980 [DE] Fed. Rep. of Germany ....... 3041231

[51] Int. Cl.$^3$ .............................................. C08K 5/54
[52] U.S. Cl. .................... 524/265; 524/264; 524/269; 525/104
[58] Field of Search ..................... 524/264, 265, 269; 525/104

[56] References Cited

U.S. PATENT DOCUMENTS

| | | |
|---|---|---|
| 3,291,863 | 12/1966 | Frey et al. ............................ 260/897 |
| 3,318,659 | 5/1967 | Bullock et al. ...................... 524/264 |
| 3,428,707 | 2/1969 | Amos et al. ......................... 260/827 |
| 3,517,083 | 6/1970 | Salyer .................................. 260/878 |
| 3,691,257 | 9/1972 | Kendrick et al. ................... 525/104 |
| 4,146,511 | 3/1979 | Moriya et al. ...................... 524/264 |
| 4,177,182 | 12/1979 | Ichikawa et al. ................... 524/265 |

FOREIGN PATENT DOCUMENTS 1236774 3/1967 Fed. Rep. of Germany .
887669 1/1962 United Kingdom .

*Primary Examiner*—Melvyn I. Marquis
*Attorney, Agent, or Firm*—Connolly and Hutz

[57] ABSTRACT

A notched-impact-resistant polyvinyl chloride moulding composition having a low shrinkage value, based on vinylchloride polymers and impact-resistant modifiers, containing from 0.01 to 5% by weight, based on the total of vinylchloride polymer and impact-resistant modifier, of liquid polysiloxanes having viscosities of from 20 to 100,000 cSt and/or solid polysiloxanes having molecular weights of from 20,000 to 500,000 and optionally conventional additives and auxiliaries.

2 Claims, No Drawings

POLYVINYL CHLORIDE MOULDING COMPOSITION

This invention relates to a notched-impact-resistant polyvinyl chloride (PVC)-moulding composition, based on vinyl chloride polymers and impact-resistant modifiers, which contains specific polysiloxanes and optionally conventional additives and auxiliaries and is distinguished by an improved processibility and by reduced shrinkage of articles produced therefrom.

The quality of notched-impact-resistant PVC moulding compositions or of the semifinished products and finished articles produced therefrom not only depends considerably on the processing operation, but also on the composition and on the type of the impact-resistant modifier which has been selected. Factors which play a significant role during processing and in the assessment of the finished article are the following, for example: rheological behaviour, output capacity, homogeneity and charge uniformity of the finished articles, toughness or notched impact strength, surface quality and ageing behaviour. Shrinkage after storage under heat also plays a significant part, in particular in profile extrusion. Therefore, the most varied moulding compositions are known with respect to processing behaviour and final quality and they require individual processing and exhibit different utility characteristics.

Such notched-impact-resistant PVC moulding compositions are primarily processed extrusion into profiles or sheets. During this operation, the moulding composition is strained both by the necessary processing temperature as well as by the shearing effect occurring during extrusion. It is known that the various PVC moulding compositions which are composed according to the most varied formulations behave differently with respect to their processing during extrusion and that there is an individual, optimum processing range for each moulding composition. If these optimum processing conditions are changed, for example, by an intended increase in the output capacity, an increase in the temperature, or friction, or also unforeseen disturbances, discrepancies are usually observed in the level of mechanical values, in the quality of the surface and also in the residual stability. A disadvantage which is frequently observed during the extrusion of such PVC moulding compositions composed of two phases is the loss of notched impact strength, as may easily occur, for example, in the unfavourable conditions described. This is due to the fact that, where there are such strains on the moulding compositions, the two-phase nature and thus in particular the notched impact strength partially collapses or even completely collapses where there is a specific strain. It is therefore desirable in particular to formulate and process moulding compositions which are composed using uncrosslinked modifiers which are thus easily soluble in the PVC phase, so that the processing reliability with respect to the notched impact strength is as great as possible. This reliability still needs to be improved, in particular for PVC moulding compositions containing ethylene-vinylacetate-copolymer (EVA) or chlorinated polyethylene as the toughness-modifying component.

A further problem in the extrusion of profiles from notched-impact-resistant PVC moulding compositions relates to manufacturing the semifinished product (profile) continuously leaving the extruder under as low internal stresses as possible. Even pure homo-PVC receives an orientation during the passage through the extrusion tool and during extrusion, due to its structure and to the processing factors. The stresses which are frozen in after the hot profile has been quenched are re-released where there is an increase in temperature, in particular in the range of the glass transition temperature, and they are expressed in a measurable shrinkage value of the profile. This shrinkage behaviour naturally impairs the usefulness of such profiles in a great number of areas. The shrinkage tendency is appreciably increased by the use of impact-resistant modifiers and as a result of the two-phase nature resulting therefrom. Thus, pure rigid PVC exhibits shrinkage values of from approximately 1 to 1.3%, measured on 20 cm long profile pieces which have been annealed for one hour at 100° C. As a result of using impact-resistant modifiers in the conventional concentration ranges, the shrinkage values may increase up to 2% (measured, for example, on a framing profile intended for the production of windows).

Therefore, there have been numerous attempts to reduce the shrinkage in extruded profiles by processing and formulation-conditioned measures. However, a generally satisfactory solution has not yet been found.

It has now been found that the processing reliability of notched-impact-resistant PVC moulding compositions may be considerably improved by adding specific polysiloxanes. This is seen in the fact that, despite a temperature increase and increased friction during extrusion, there is no decrease in the notched impact strength or only a weak or delayed increase occurs. For example, an impact-resistant PVC moulding composition having a 6% EVA content already exhibits clear indications of a reduction in the notched impact strength during extrusion at composition temperatures of from 180° to 185° C. By simultaneously using specific polysiloxanes, the reliable processibility may be extended to approximately 200° C. and thus the sensitivity to fluctuations in the processing conditions may be substantially reduced. The reduction in the tendency towards loss of strength is also exhibited in the strain time of a PVC moulding composition based on EVA/PVC at a constant temperature. The strain time on a rolling mill may be substantially increased before there is a reduction in the notched impact strength. Furthermore, it is to be observed during extrusion experiments that a clear reduction in energy consumption occurs during extrusion when PVC moulding compositions modified with specific polysiloxanes are processed.

Another unexpected effect is seen in that the notched-impact-resistant PVC moulding compositions containing polysiloxanes also exhibit an improvement in the shrinkage behaviour of profiles produced therefrom. The shrinkage value is from 0.3 to 0.5% lower in comparison to that of moulding compositions which are free from polysiloxanes but have otherwise the same formulation and processing parameters, i.e. it is reduced, for example, from 1.8 to 1.4%.

It is considered as particularly surprising that the polysiloxanes used according to the invention produce the effects described without an influence on the molecular weight within a wide range which has been observed. The type and structure of the siloxanes and the concentration in the PVC moulding composition are probably essential for the magnitude of the effects observed.

The present invention provides a notched-impact-resistant polyvinyl chloride moulding composition having a low shrinkage value and based on vinyl chloride polymers and impact-resistant modifiers, optionally containing conventional additives and auxiliaries, characterised in that the moulding composition contains a total of from 0.01 to 5% by weight, preferably from 0.1 to 2.0% by weight, based on the total of vinyl chloride polymer and impact-resistant modifier, of liquid polysiloxanes having viscosities of from 20 to 100,000 cSt and/or solid polysiloxanes having molecular weights of from 20,000 to 500,000. The liquid polysiloxanes preferably have viscosities of from 60 to 50,000 cSt.

Polydimethylsiloxanes and polymethylphenylsiloxanes are preferred polysiloxanes.

Polysiloxanes which are particularly preferred are the following:
a. liquid polydimethylsiloxanes having methyl terminal groups in the viscosity range of from 20 to 100,000 cSt,
b. liquid polymethylphenylsiloxanes having methyl terminal groups in the viscosity range of from 20 to 100,000 cSt,
c. solid polydimethylsiloxanes having OH terminal groups and molecular weights of from MW 20,000 to 500,000, and
d. polydimethylsiloxanes having vinyl end groups and molecular weights of from MW 40,000 to 100,000.

The moulding composition according to the invention is composed of the following:
(a) from 99 to 80, preferably from 99 to 85% by weight, of vinylchloride polymer (resin phase), and
(b) from 1 to 20, preferably from 1 to 15% by weight, of impact-resistant modifier (elastomer phase).

The components (a) and (b) may be partly or completely chemically linked together in this two-phase moulding composition and may be, for example, in the form of a graft polymer.

Vinyl chloride polymers which are suitable include the following: homopolyvinylchloride, copolymers of vinylchloride with up to 20% by weight of ethylenically unsaturated comonomers, graft polymers of vinylchloride, in particular having the impact-resistant modifiers as the graft base, and mixtures of these polymers.

Impact-resistant modifiers which are suitable include the following: elastomeric polymers or polymers containing elastomers, such as ethylene-vinylester, in particular ethylene-vinylacetate copolymers, chlorinated polyethylene, acrylate rubbers, ethylene propylene rubber or ethylene propylene terpolymers, ethylene acrylester copolymers, polybutadiene and copolymers or graft polymers of butadiene with, for example, (meth)acrylonitrile, styrene and methyl acrylate. Ethylene-vinylacetate copolymers and chlorinated polyethylene are preferred.

Chlorinated polyethylene is produced, for example, by chlorinating high-molecular weight low pressure polyethylene having densities of from 0.940 to 0.965. It has chlorine contents of from 28 to 42% by weight and has a reduced specific viscosity of from 1 to 5 dl/g (measured in 0.5% by weight solution in tetralin at 135° C.). production of chlorinated polyethylene (CPE) or of PVC/CPE moulding compositions is described, for example, in German Pat. Nos. 1,236,774; 1,045,089; 1,109,365, and in German Auslegeschrift Nos. 1,469,990 and 1,266,969.

Ethylene-vinylacetate copolymers which are suitable contain from 25 to 60, preferably from 35 to 50% by weight of vinylacetate and have molecular weights of from 20,000 to 500,000.

Moulding compositions which are preferred are composed of the following:
(a) from 99 to 85% by weight of polyvinylchloride, and (b) from 1 to 15% by weight of ethylene-vinylacetate-copolymer, or of graft polymers produced from the following:
(a) from 97 to 85% by weight of polymerised units of vinylchloride on
(b) from 3 to 15% by weight of ethylene-vinylacetate copolymer, the total of (a) and (b) being 100% by weight in each case.

Furthermore, preferred moulding compositions are based on mixtures of (a) polyvinylchloride and (b) a graft polymer of the following:
(1) from 40 to 96% by weight of polymerised units of vinylchloride on
(2) from 60 to 4% by weight of ethylene-vinylacetate copolymer, the total of (1) and (2) always being 100% by weight and the total content of (2), based on the mixture of (a) and (b), being from 3 to 15% by weight.

Moulding compositions having a content of ethylene-vinylacetate copolymer of from 4 to 8% by weight are particularly preferred.

The impact-resistant modifiers are added in pure form as blocks, granules or powder, and, for example, talcum, chalk or silicates may be contained as additives to improve pourability. However, a variation which is frequently used comprises initially subjecting the rubber-elastic polymers to a graft polymerisation process, preferably with vinylchloride, and optionally also with other monomers, and introducing the resulting graft polymers into the PVC moulding composition. It is also possible to control the graft polymerisation process such that the required ratio of PVC resin phase and elastomer phase is contained in the graft polymer so that there is no need for further mixing with PVC, which is possible according to the invention, and thus the graft polymer consisting of polymerised vinyl-chloride and of the elastomer phase itself constitutes the moulding composition.

Conventional additives and auxiliaries which may be contained in the moulding composition are the following, for example, corresponding to the requirements in each case: stabilizers, lubricants, pigments, dyes, fillers, flow aids and flameproofing agents.

A conventional component of PVC moulding compositions comprises, for example, stabilizers against thermal and ageing-conditioned decomposition, such as barium/cadmium- or lead salts, tin compounds and/or epoxy compounds as are usually used in PVC technology. Furthermore, lubricants may be used to improve the flow behaviour, such as, for example, metal soaps, higher fatty alcohols, fatty acid glycerine esters, synthetic waxes or paraffin and optionally flow aids based on polyacrylate or styrene/acrylonitrile.

The moulding composition according to the invention may be produced, prepared and mixed or processed according to the most varied methods. The PVC moulding composition is initially produced such that the individual components are mixed thoroughly in high-speed mixers, optionally with a temperature increase. Mixtures of this type may be directly supplied to the different processing processes (dry-blend processing) or they may pass through a granulation stage before the next and final moulding operation.

However, it is possible and known in the art to homogenise the components of the moulding composition on rollers, kneading machines, internal mixers or mixing screws and either to further process them directly or to initially produce a granulate.

The following processes which are known to some extent from German Auslegeschrift No. 1,495,694 and from German Offenlegungsschrift No. 1,544,874 are particularly suitable:

1. Polyvinylchloride and/or polyvinylchloride copolymers with ethylenically unsaturated compounds are mixed together with the pulverulent or granule-form impact-resistant modifier, optionally with crushing, with the polysiloxane compound and the conventional additives (stabilizers, lubricants, fillers and pigments) and are directly processed (dry-blend process) or are further processed via the granulation stage; mixtures produced on rollers, kneaders or screws are further processed into a granulate or directly using a calender. The process described here relates to all impact-resistant modifiers, but in particular to ethylene-vinylacetate copolymers, chlorinated polyethylene and acrylate polymers.

2. Graft polymers of vinylchloride on ethylene-vinyl acetate copolymers are mixed in a high-speed mixer, optionally with the admixture of homo-PVC to adjust the necessary EVA concentration, with the addition of the polysiloxanes and further processing auxiliaries, and are further processed. It is also possible to process such mixtures using rollers, kneading machines and internal mixers.

3. Before carrying out the graft polymerisation of vinylchloride on ethylene-vinylacetate copolymers, the polysiloxanes are added in the necessary quantities to the graft mixture and they pass through the polymerisation process. After the reaction has finished, they are in the graft polymer which is further processed according to 1 or 2.

4. After the PVC polymerisation or the graft polymerisation of vinylchloride on EVA copolymers has finished, the preferably liquid polysiloxanes are added to the PVC suspension or dispersion and are homogeneously distributed with stirring. The polysiloxanes are drawn onto the PVC grains and are in the PVC graft polymer after isolation.

Pulverulent mixtures which are ready for processing (dry-blends) or processing-ready granules are processed into semifinished products or finished articles using extruders, injection moulding machines or blowing machines as known in the art. Of course, it is also possible to process the moulding compositions using rollers, presses or moulding calenders.

The moulding compositions according to the invention are distinguished by their quality with respect to their mechanical value level and their behaviour in ageing and weathering processes and they are suitable for the most varied areas of use. Extruded profiles are primarily produced therefrom, but the moulding compositions are also processed into injection-moulded articles or calendar films. While the notched-impact-resistant PVC moulding compositions which are provided with light-stable impact-resistant modifiers are used for internal purposes, in this case, including in particular articles of furniture and building parts, pipes, films and packing materials, the systems having the highest weather resistance are used for external purposes, in particular in the building industry. Light-stable, notched-impact-resistant PVC moulding compositions based on ethylene-vinylacetate copolymers according to the invention are particularly suitable above all in the production of window profiles, facing panels, benches for parks and sport stadiums, gutters and downpipes, road restriction posts and motorway noise control constructions.

EXAMPLES

In the following Examples, the influence of the polysiloxanes A-F is illustrated in accordance with the invention. Due to the addition of these polysiloxanes to moulding compositions, consisting of rigid PVC and ethylene-vinylacetate, a substantial expansion in the processing scope and a clear reduction in the shrinkage tendency in extruded profiles are achieved.

Table of the polysiloxanes used in the Examples:

polysiloxane A: polydimethylsiloxane having methyl terminal groups and a viscosity of 20 cSt.
polysiloxane B: polydimethylsiloxane having methyl terminal groups and a viscosity of 140 cSt.
polysiloxane C: polymethylphenylsiloxane having methyl terminal groups and a viscosity of 350 cSt.
polysiloxane D: polymethylphenylsiloxane having methyl terminal groups and a viscosity of 1,000 cSt.
polysiloxane E: polydimethylsiloxane having OH terminal groups and a molecular weight MW of 90,000.
polysiloxane F: polydimethylsiloxane having vinyl terminal groups and a molecular weight MW of 500,000.

EXAMPLES 1.1–1.8

1.1 A rolled sheet is produced as described in Table 1 from 94 parts by weight of suspension PVC (K-value 65), 6 parts by weight of ethylenevinylacetate (EVA, molecular weight MW=150,000, vinylacetate content 45% by weight) and 1.5 parts by weight of di-n-octyl tin mercaptide, on a laboratory roll mill, is processed into a pressed plate and the notched impact strength is determined on test bodies produced therefrom.

1.2 Composition as in Example 1.1+1.5 parts by weight of polysiloxane A, production of the test bodies and test as in Example 1.1.

1.3 Composition as in Example 1.1+1.0 parts by weight of polysiloxane B, production of the test bodies and test as in Example 1.1.

1.4 Composition as in Example 1.1+1.5 parts by weight of polysiloxane C, production of the test bodies and test as in Example 1.1.

1.5 Composition as in Example 1.1+0.5 parts by weight of polysiloxane C, production of the test bodies and test as in Example 1.1.

1.6 Composition as in Example 1.1+1.5 parts by weight of polysiloxane D, production of the test bodies and test as in Example 1.1.

1.7 Composition as in Example 1.1+1.0 parts by weight of polysiloxane E, production of the test bodies and test as in Example 1.1.

1.8 Composition as in Example 1.1+1.5 parts by weight of polysiloxane F, production of the test bodies and test as in Example 1.1.

Table 1

Notched impact strength (kJ/m$^2$) according to DIN 53 453 at 23° C., depending on the rolling temperature, measured on test bodies which were produced from the pressed plates of Examples 1.1–1.8.
Production of rolled sheets: Laboratory roller, roller width 230 mm, roller diameter 110 mm, roller speeds 22:18 r.p.m. rolling temperature in °C. see below, rolling time 10 minutes.
Production of pressed plates: Dimensions: 120×120×4 mm; pre-heating 7 minutes, pressing 3 minutes at 24.5 N/mm$^2$, pressing temperature 175° C.

described in Table 1 and the notched impact strength is determined on test bodies produced therefrom.

2.2 15 parts by weight of polysiloxane A are added to 1106 parts by weight of a PVC moulding composition, composed as in Example 2.1, and are prepared, rolled, pressed and tested, as described in Example 2.1.

2.3 8 parts by weight of polysiloxane B are added to 1106 parts by weight of a PVC moulding composition, composed as in Example 2.1, and are prepared, rolled, pressed and tested, as described in Example 2.1.

2.4 10 parts by weight of polysiloxane C are added to 1106 parts by weight of a PVC moulding composition, composed as in Example 2.1, and prepared, rolled, pressed and tested, as described in Example 2.1.

| EXAMPLES | Parts by weight of the polysiloxanes A–F per 100 parts by weight of Example 1.1 | Notched impact strength values in kJ/m$^2$ at 23° C. depending on following rolling temperatures | | | | | | |
|---|---|---|---|---|---|---|---|---|
| | | 160° C. | 170° C. | 180° C. | 185° C. | 190° C. | 195° C. | 200° C. |
| 1.1 | Comparative Example | 12 | 39 | 40 | 14 | 4 | 4 | 3 |
| 1.2 | 1.5 parts by weight A | 15 | 35 | 39 | 41 | 30 | 13 | 7 |
| 1.3 | 1.0 parts by weight B | 11 | 29 | 38 | 39 | 28 | 20 | 14 |
| 1.4 | 1.5 parts by weight C | 11 | 32 | 36 | 45 | 42 | 31 | 20 |
| 1.5 | 0.5 parts by weight C | 9 | 27 | 37 | 35 | 24 | 20 | 13 |
| 1.6 | 1.5 parts by weight D | 16 | 37 | 39 | 40 | 38 | 22 | 18 |
| 1.7 | 1.0 parts by weight E | 13 | 29 | 42 | 29 | 21 | 17 | 10 |
| 1.8 | 1.5 parts by weight F | 20 | 33 | 37 | 45 | 24 | 18 | 10 |

As may be seen from Table 1, the addition of the polysiloxanes A–F results in an expansion of the processing temperature range of from 10° to 15° C. with outstanding notched impact strength values. It may also be seen from Table 1 that the expansion of the processing temperature range does not depend on the molecular weight of the polysiloxanes A–F.

EXAMPLES 2.1–2.5

2.1 600 parts by weight of a vinylchloride-EVA-graft polymer (VCEVA) (EVA-content 10% by weight, K value 68), 400 parts by weight of suspension PVC (K value 65), 25 parts by weight of solid barium/cadmium stabilizer (at least 10% Cd content), 10 parts by weight of epoxidised soybean oil, 5 parts by weight of organophosphite, 3 parts by weight of oxystearic acid, 3 parts by weight of wax ester, 30 parts by weight of white pigment (titanium dioxide, rutile type) and 30 parts by weight of filler (coated calcium carbonate) are prepared in a heating-cooling mixer (1500 r.p.m.) by the method which is conventional for rigid-PVC-dry-blends. In each case, 110 g of this PVC moulding composition (Comparative Example) are processed into rolled sheets on a laboratory roll mill, as described in Table 1, under rolling conditions, as described in Table 1, are pressed into plates as 2.5 10 parts by weight of polysiloxane C are added to 120 parts by weight of a VCEVA commercial product (EVA content 50% by weight, K value 75), 880 parts by weight of S-PVC (K value 65), stabilizers, lubricants, pigment and fillers as in Example 2.1, and are prepared, rolled, pressed and tested as described in Example 2.1.

Table II

Notched impact strength (kJ/m$^2$) according to DIN 53 453 at 23° C., depending on the rolling temperature, measured on sample bodies which were prepared from pressed plates of Examples 2.1–2.5.
Production of rolled sheets: as in Table 1.
Production of pressed plates: as in Table 1.

| EXAMPLES | Parts by weight of the polysiloxanes A–F per 110 parts by weight of Example 2.1 | Notched impact strength values in kJ/m$^2$ at 23° C. depending on following rolling temperature | | | | | | |
|---|---|---|---|---|---|---|---|---|
| | | 160° C. | 170° C. | 180° C. | 185° C. | 190° C. | 195° C. | 200° C. |
| 2.1 | Comparative Example | 12 | 37 | 40 | 11 | 4 | 4 | 3 |
| 2.2 | 1.5 parts by weight A | 13 | 35 | 39 | 39 | 28 | 19 | 14 |
| 2.3 | 0.8 parts by weight B | 14 | 38 | 36 | 35 | 21 | 14 | 9 |
| 2.4 | 1.0 parts by weight C | 13 | 36 | 41 | 38 | 26 | 21 | 15 |
| 2.5 | 1.0 parts by weight C | 12 | 33 | 37 | 31 | 20 | 15 | 10 |

As may be seen from Table II, the expansion of the processing temperature range by from 10° to 15° C. is also achieved by adding the polysiloxanes A–F to known commercial vinylchloride-ethylene vinylacetate graft polymers (VCEVA) in a formulation which is conventional in practice. During this process, VCEVA types having a different EVA content may be used to adjust the required modifier content.

EXAMPLES 2.6–2.11

2.6 600 parts by weight of a VCEVA commercial prod-

Production of pressed plates: Dimensions 100×100×4 mm, pre-heating 7 min., pressing 3 min. at 24.5 N/mm², pressing temperature 175° C.

| EXAMPLES | Parts by weight of the polysiloxanes A–F per 1000 parts by weight of Example 2.6 or 2.7 | | | Notched impact strength values in kJ/m² at 23° C. depending on following rolling conditions | | | |
|---|---|---|---|---|---|---|---|
| | | | | 175° C. 10' | 175° C. 20' | 175° C. 30' | 175° C. 40' |
| | Parts by weight | SI-type | Example | | | | |
| 2.6 | — | — | Comparison | 28 | 9 | 7 | 7 |
| 2.7 | — | — | Comparison | 32 | 13 | 5 | 4 |
| 2.8 | 15 | A | 2.6 | 35 | 29 | 23 | 21 |
| 2.9 | 15 | B | 2.6 | 28 | 24 | 25 | 20 |
| 2.10 | 15 | E | 2.6 | 26 | 36 | 41 | 43 |
| 2.11 | 15 | B | 2.7 | 29 | 29 | 27 | 23 | uct (EVA-content 10% by weight, K value 68), 400 parts by weight of suspension PVC (K value 65), 15 parts by weight of a solid tin stabilizer (di-n-octyl tin mercaptide) are prepared in a heating-cooling mixer (1500 r.p.m.) in the manner conventional for rigid PVC dry blends. 1000 g of this PVC moulding composition (Comparative Example) are processed into rolled sheets on a laboratory roll mill, as described in Table III, under rolling conditions, as described in Table III, pressed into plates, as described in Table III, and the notched impact strength is determined on the test bodies produced therefrom.

2.7 1000 parts by weight of a VCEVA commercial product (EVA-content 6% by weight, K value 69) and 15 parts by weight of a solid tin stabilizer (di-n-octyl tin mercaptide) are prepared, rolled and pressed and the notched impact strength is determined, as described in Example 2.6

2.8 15 parts by weight of polysiloxane A are added to 1015 parts by weight of a PVC moulding composition, composed as in Example 2.6, and are prepared, rolled, pressed and tested, as described in Example 2.6.

2.9 15 parts by weight of polysiloxane B are added to 1015 parts by weight of a PVC moulding composition, composed as in Example 2.6, and are prepared, rolled, pressed and tested, as described in Example 2.6.

2.10 100 parts by weight of a PVC moulding composition, composed and prepared as described in Example 2.6, are rolled, pressed and tested, as described in Example 2.6, after the addition of 1.5 parts by weight of polysiloxane E.

2.11 15 parts by weight of polysiloxane B are added to 1015 parts by weight of a PVC moulding composition, composed as described in Example 2.7, and are prepared, rolled, pressed and tested as described in Example 2.6.

TABLE III

Notched impact strength (kJ/m²) according to DIN 53 453 at 23° C. depending on the rolling duration at 175° C. rolling temperature, measured on test bodies which were produced from pressed plates according to Examples 2.6–2.11.
Production of rolled sheets: Laboratory roller, roller width 450 mm, roller diameter 204 mm, roller speeds 29:24, roller gap 0.5 mm, roll temperature 175° C., sampling from current rolled sheet of following pressed plate, see below, after 10', 20', 30', 40'.

As may be seen from Table III, by adding the polysiloxanes to EVA-modified rigid-PVC moulding compositions, the duration friction resistance is increased fourfold under the experimental conditions described, without a substantial loss of strength occurring.

EXAMPLES 2.12–2.17

2.12 600 parts by weight of a VCEVA commercial product (EVA-content 10% by weight, K value 68), 400 parts by weight of suspension PVC (K value 65), 25 parts by weight of solid barium-cadmium stabilizer (at least 10% Cd-content), 10 parts by weight of epoxidised soybean, oil, 5 parts by weight of organophosphite, 3 parts by weight of oxystearic acid, 3 parts by weight of wax ester, 30 parts by weight of titanium dioxide (rutile type), and 30 parts by weight of filler (coated calcium carbonate) are prepared in a heating-cooling mixer (1500 r.p.m.) by the method conventional for rigid-PVC-dry blends. In each case, 110 g of this PVC moulding composition (Comparative Example) are processed into rolled sheets on a laboratory roll mill, as described in Table IV, under roll conditions, as described in Table IV, are pressed into plates, as described in Table IV, and the notched impact strength is determined on the test bodies produced therefrom.

2.13 1,000 parts by weight of a VCEVA commercial product (EVA-content 6% by weight, K value 69), stabilizers, lubricants, pigment and fillers as described in Example 2.12, are prepared as described in Example 2.12. In each case, 110 g of this PVC moulding composition (Comparative Example) are rolled, pressed and tested as described in Example 2.12.

2.14 15 parts by weight of polysiloxane D are added to 1106 parts by weight of PVC moulding composition, composed as in Example 2.12, and the product is prepared, rolled, pressed and tested as described in Example 2.12.

2.15 15 parts by weight of polysiloxane C are added to 1106 parts by weight of a PVC moulding composition, composed as in Example 2.12, and the product is prepared, rolled, pressed and tested, as described in Example 2.12.

2.16 110 parts by weight of a PVC moulding composition, composed and prepared as described in Example 2.12, are rolled, pressed and tested, as described in Example 2.12, after the addition of 1.5 parts by weight of polysiloxane E.

2.17 5 parts by weight of polysiloxane B are added to 1106 parts by weight of a PVC moulding composition, composed as in Example 2.13, and the product is prepared, rolled, pressed and tested as described in Example 2.12.

TABLE IV

Notched impact strength (kJ/m$^2$) according to DIN 53 453 at 23° C., depending on the rolling duration at 185° C. roll temperature, measured on test bodies which were produced from pressed plates of Examples 2.12–2.17.

Production of rolled sheets: Laboratory roller, roller width 450 mm, roller diameter 204 mm, roller speeds 29:24, roller gap 0.5 mm, roll temperature 185° C., sampling from the current rolled sheet of following pressed plates after 10', 20', 30', 40'.

Production of pressed plates: Dimensions 100×100×4 mm, pre-heating 7 mins., pressing 3 mins. at 25.3 N/mm$^2$, pressing temperature 175° C.

|  | Parts by weight of the polysiloxanes A–F per 1000 parts by weight of Example 2.12 or 2.13 | | | Notched impact strength values in kJ/m$^2$ at 23° C. depending on following rolling conditions | | | |
|---|---|---|---|---|---|---|---|
| EXAMPLES | Parts by weight | SI-type | Example | 185° C. 10' | 185° C. 20' | 185° C. 30' | 185° C. 40' |
| 2.12 | — | — | Comparison | 15 | 6 | 4 | 3 |
| 2.13 | — | — | Comparison | 44 | 11 | 10 | 8 |
| 2.14 | 15 | D | 2.12 | 32 | 40 | 44 | 40 |
| 2.15 | 15 | C | 2.12 | 30 | 24 | 20 | 35 |
| 2.16 | 15 | E | 2.12 | 40 | 23 | 22 | 20 |
| 2.17 | 5 | B | 2.13 | 45 | 33 | 23 | 22 |

As may be seen from Table IV, the addition of the polysiloxanes to EVA-modified rigid-PVC moulding compositions in a formulation conventional in practice produces a substantial increase in the duration friction resistance, even at an elevated roll temperature, without a substantial loss of strength.

EXAMPLES 2.18–2.20

2.18 A PVC moulding composition consisting of 100 parts by weight of a VCEVA commercial product (EVA-content 6% by weight, K value 69), 2.5 parts by weight of a solid barium/cadmium complex stabilizer (at least 10% Cd content), 1 part by weight of epoxidised soybean oil, 0.4 parts by weight of an organic phosphite, 0.2 parts by weight of oxystearic acid, 0.3 parts by weight of wax ester, 3.5 parts by weight of titanium dioxide and 2.5 parts by weight of calcium carbonate is processed in a heating-cooling mixer (1500 r.p.m.) into a pourable, homogeneous powder mixture (dry blend) according to the processing methods conventional for rigid PVC.

2.19 0.5 parts by weight of polysiloxane C are added to a PVC moulding composition, composed as described in Example 2.18, and the product is prepared, as described in Example 2.18.

2.20 A PVC moulding composition, consisting of 100 parts by weight of a VCEVA-laboratory graft product (EVA content 6% by weight; content of polysiloxane B 0.51% by weight; K value 66), stabilizers, lubricants, pigments and fillers as described in Example 2.18 is prepared as described in Example 2.18.

Production of the VCEVA-laboratory graft product (2.20)

A stirrer-equipped autoclave is charged with 525 parts by weight of an EVA/copolymer ($\eta$=1.23; measured in toluene; vinylacetate content 45% by weight), 45 parts by weight of polysiloxane B, 5 parts by weight of $\alpha,\alpha'$-azodiisobutyronitrile, 22,500 parts by weight of water, 50 parts by weight of methyl cellulose (65 HG 50 cps, produced by DOW) and 8,900 parts by weight of vinylchloride. The mixture is stirred for 5 hours at room temperature to dissolve the solid substances and polymerization is then carried out by heating for 15 hours at 60° C. After the reaction mixture has cooled and the stirrer-equipped autoclave has been depressurized, 8780 parts by weight (92%) of a fine-particled product are isolated. The product is dried under vacuum at 60° C. and it contains 6% by weight of EVA copolymer and 0.51% by weight of polysiloxane B. The K value of the graft product is 66, measured in cyclohexanone.

These powder mixtures (2.18, 2.19, 2.20) are extruded into a window profile on a double-screw extruder with a screw diameter of 85 mm and a 17D screw length, using a profile tool, consisting of a nozzle and a three-part vacuum calibration.

Test bodies are taken from the extruded profiles for the following tests:

a. Notched impact strength at 23° C. according to DIN 53 453.

b. Determination of the dimension change after storing under heat according to No. 3.2.8. of the quality and test evaluations RAL-RG 716/1 for plastics window profiles and plastics-windows of the QK registered society and GKF registered society.

c. Determination of the strength reserves by means of the notched impact strength according to DIN 53 453 on sample bodies, produced by granulating the window profile, rolling each 100 g of this granulate at 175° C. and with an increasing rolling time of 2', 4', 6', 8' and subsequent pressed plate production.

TABLE V

| | Machine data and test results for the extruded profiles of Examples 2.18–2.20 | | | | | |
|---|---|---|---|---|---|---|
| | Example 2.18 Comparison VCEVA commercial product | Example 2.19 VCEVA commercial product + 0.5% poly-siloxane C | Example 2.20 VCEVA laboratory product + 0.51% poly-siloxane B | Example 2.18 Comparison VCEVA commercial product | Example 2.19 VCEVA commercial product + 0.5% poly-siloxane C | Example 2.20 VCEVA laboratory product + 0.51% poly-siloxane B |
| Composition temperature (°C.) Screw | 186 | 186 | 186 | 196 | 196 | 196 |

TABLE V-continued

Machine data and test results for the extruded profiles of Examples 2.18–2.20

|  | Example 2.18 Comparison VCEVA commercial product | Example 2.19 VCEVA commercial product + 0.5% poly-siloxane C | Example 2.20 VCEVA laboratory product + 0.51% poly-siloxane B | Example 2.18 Comparison VCEVA commercial product | Example 2.19 VCEVA commercial product + 0.5% poly-siloxane C | Example 2.20 VCEVA laboratory product + 0.51% poly-siloxane B |
|---|---|---|---|---|---|---|
| speed (Min$^{-1}$) | 10.6 | 10.6 | 10.6 | 10.6 | 10.6 | 10.6 |
| $N_{motor}$(kW) | 10.3 | 9.7 | 9.8 | 9.8 | 9.4 | 9.3 |
| Output (kg/h) | 67 | 71 | 70 | 66 | 71 | 69 |
| Notched impact strength acc. to DIN 53 453 at 23° C. (kJ/m$^2$) | 36 | 38 | 29 | 18 | 32 | 26 |
| Dimension change after heat-storage acc. to RAL-RG 716/1 (%) | 1.9 | 1.5 | 1.4 | 2.1 | 1.7 | 1.6 |
|  | 2.0 | 1.5 | 1.5 | 2.1 | 1.5 | 1.5 |
|  | 1.8 | 1.6 | 1.5 | 1.9 | 1.6 | 1.6 |

As may be seen from Table V, the content of 0.5% by weight of polysiloxane C or 0.51% by weight of polysiloxane B in EVA-modified rigid-PVC moulding compositions produces substantially lower shrinkage values in the extruded profiles. This shrinkage reducing effect is furthermore not lost by the increase in the composition temperature from 186° C. to 196° C.

Although all the experimental installations have a screw speed, maintained constant, of 10.6 r.p.m. surprisingly, the current consumption is clearly reduced in the processing of the siloxane-modified versions, whereby there is simultaneously an increase in the output production.

The effect of the expansion of the processing scope is also clearly pronounced in the extruded profiles. Thus, notched impact strengths of 32 or 26 kJ/m$^2$ are achieved at the increased composition temperature of 196° C., whereas only 18 kJ/m$^2$ was measured on the siloxane-free comparative sample.

kJ/m$^2$ and they still retain their high notched impact strength with 19 kJ/m$^2$ after an 8 minute roll time at 175° C. The material extruded at 196° C. composition temperature also has substantially higher notched impact strengths at roll times of 4, 6 and 8 minutes, in contrast to the identically treated polysiloxane-free sample.

EXAMPLES 2.21 AND 2.22

2.21 A PVC moulding composition, consisting of 90 parts by weight of suspension PVC with a K value of 65, 10 parts of a chlorinated polyethylene having a chlorine content of 36% by weight and a reduced viscosity of 1.6 dl/g (measured on a 0.5% solution in tetralin at 135° C.), 2.5 parts by weight of a solid barium/cadmium complex stabilizer (at least 10% Cd content), 1 part by weight of epoxidised soybean oil, 0.4 parts by weight of an organic phosphite, 0.2 parts by weight of oxystearic acid, 0.2 parts by weight of

TABLE VI

Detection of the reduction in the processing sensitivity in the Examples 2.18–2.20
The profiles extruded from the moulding compositions of Examples 2.18–2.20 are granulated, then, in each case, 100 g of this granulate are rolled on a laboratory roll mill, as described in Table I, at 175° C. and with increasing roll times, are pressed into plates, and test bodies are produced therefrom and the notched impact strength is determined.

| Roll temperature 175° C. Roll times, see below Pressing temperature 175° C. | Example 2.18 Composition temperature during extrusion 186° C. | Example 2.19 Composition temperature during extrusion 186° C. | Example 2.20 Composition temperature during extrusion 186° C. | Example 2.18 Composition temperature during extrusion 196° C. | Example 2.19 Composition temperature during extrusion 196° C. | Example 2.20 Composition temperature during extrusion 196° C. |
|---|---|---|---|---|---|---|
| Roll time |  |  |  |  |  |  |
| 2 min. | 26 (kJ/m$^2$) | 36 (kJ/m$^2$) | 30 (kJ/m$^2$) | 14 (kJ/m$^2$) | 30 (kJ/m$^2$) | 26 (kJ/m$^2$) |
| 4 min. | 16 (kJ/m$^2$) | 31 (kJ/m$^2$) | 25 (kJ/m$^2$) | 9 (kJ/m$^2$) | 28 (kJ/m$^2$) | 25 (kJ/m$^2$) |
| 6 min. | 8 (kJ/m$^2$) | 30 (kJ/m$^2$) | 22 (kJ/m$^2$) | 7 (kJ/m$^2$) | 28 (kJ/m$^2$) | 22 (kJ/m$^2$) |
| 8 min. | 7 (kJ/m$^2$) | 28 (kJ/m$^2$) | 19 (kJ/m$^2$) | 4 (kJ/m$^2$) | 23 (kJ/m$^2$) | 18 (kJ/m$^2$) |

Table VI clearly shows that, by adding the polysiloxane, the resistance of the moulding composition to a loss of strength during mechanical strain on the roller is substantially increased. Whilst the polysiloxane-free Comparative Example only has a notched impact strength of 8 kJ/m$^2$ after a 6 minute roll time, the modified samples have results of 22 kJ/m$^2$ or 30 kJ/m$^2$ or 30 wax ester, 3.5 parts by weight of titanium dioxide and 2.5 parts by weight of calcium carbonate, is processed into a pourable dry blend in a heating-cooling mixer (1500 r.p.m.) according to the preparation methods conventional for rigid PVC.

2.22 0.5 parts of polysiloxane A are added to the PVC moulding composition described under 2.21, before preparation in the high-speed mixer. The commercial method also corresponds to Example 2.21. These powder mixtures (2.21 and 2.22) are extruded into a window profile using a double-screw extruder with a screw diameter of 85 mm and a 17 d screw length with a profile tool, consisting of a nozzle and a three-part vacuum calibtration. Test bodies are taken from the extruded profiles for measuring the notched impact strength (DIN 53 453) and for determining the change in length after storage under heat (RAL-RG 716/1).

TABLE VII

Machine data and test results for extruded profiles of Examples 2.21 and 2.22

|  | Example 2.21 Comparison PVC/ CPE | Example 2.22 PVC/ CPE + 0.5% poly-siloxane A | Example 2.21 Comparison PVC/ CPE | Example 2.22 PVC/ CPE + 0.5% poly-siloxane A |
| --- | --- | --- | --- | --- |
| Composition temperature (°C.) | 184 | 184 | 197 | 197 |
| Screw speed (min$^{-1}$) | 10.2 | 10.2 | 10.2 | 10.2 |
| $N_{motor}$(KW) | 9.5 | 8.9 | 9.2 | 8.5 |
| Output (kg/h) | 61 | 65 | 60 | 63 |
| Notched impact strength acc. to DIN 53 453 at 23° C. (kJ/m$^2$) | 31 | 34 | 15 | 30 |
| Dimension change after heat-storage acc. to RAL-RG 716/1 (%) | 1.8 1.8 1.9 | 1.6 1.4 1.5 | 1.9 2.0 2.0 | 1.7 1.5 1.7 |

The effect of the added polysiloxane is also demonstrated in this Example of the processing of a moulding composition of polyvinylchloride and chlorinated polyethylene, the notched impact strength of the extruded profiles remaining practically unchanged at 30 kJ/m$^2$ at the elevated composition temperature of 197° C., in contrast to the polysiloxane-free comparative Example. Furthermore, it is also observed here that the current consumption is decreased in each case with an increase in the output by the addition of the polysiloxane. It is also observed that, at the two composition temperatures (184° C. and 197° C.) selected in the experiment, the polysiloxane-modified samples show a clear reduction in shrinkage after storage under heat.

We claim:

1. A notched-impact-resistant moulding composition having a low shrinkage value selected from the group consisting of
   I. a mixture consisting of (a) from 99 to 85% by weight of polyvinyl chloride, (b) from 1 to 15% by weight of ethylene-vinyl acetate copolymer containing from 25 to 60% by weight of vinyl acetate and having a molecular weight of from 20,000 to 500,000 and (c) from 0.01 to 5% by weight, based on the total weight of (a) plus (b), of a polysiloxane;
   II. a mixture consisting of a graft polymer of 3 to 15% by weight of ethylene-vinyl acetate copolymer containing from 25 to 60% by weight of vinyl acetate and having a molecular weight of from 20,000 to 500,000 having grafted thereon from 97 to 85% by weight of polymerized units of vinyl chloride and from 0.01 to 5% by weight, based on the weight of said graft polymer, of a polysiloxane and
   III. a mixture consisting of polyvinyl chloride, a graft polymer of from 60 to 4% by weight of ethylene-vinyl acetate copolymer containing from 25 to 60% by weight of vinyl acetate and having a molecular weight of from 20,000 to 500,000 having grafted thereon from 40 to 96% by weight of polymerized units of vinyl chloride, the total content of said ethylene-vinyl acetate copolymer in said mixture being from 3 to 15% by weight, based on the weight of polyvinyl chloride and said graft polymer, and from 0.01 to 5% by weight, based on the total polyvinyl chloride and graft polymer, of a polysiloxane, said polysiloxane of each of I, II and III being selected from the group consisting of polydimethylsiloxane having methyl terminal groups and a viscosity of 20 cSt; polydimethylsiloxane having methyl terminal groups and a viscosity of 140 cSt; polymethylphenylsiloxane having methyl terminal groups and a viscosity of 350 cSt; polymethylphenylsiloxane having methyl terminal groups and a viscosity of 1,000 cSt; polydimethylsiloxane having OH terminal groups and a molecular weight MW of 90,000 and polydimethylsiloxane having vinyl terminal groups and a molecular weight MW of 500,000.

2. The mixture of the notched-impact-resistant moulding composition of claim 1 wherein said polysiloxane is present in an amount of from 0.1 to 2.0% by weight.

* * * * *